United States Patent [19]
Robinette

[11] Patent Number: 5,211,526
[45] Date of Patent: May 18, 1993

[54] MOBILE CRANE

[76] Inventor: Larry Robinette, 15 Santuck St., Greenville, S.C. 29611

[21] Appl. No.: 843,182

[22] Filed: Feb. 28, 1992

[51] Int. Cl.⁵ .............................................. B60P 1/54
[52] U.S. Cl. ................................. 414/550; 414/462; 414/543; 414/718; 224/273; 212/238; 212/242; 212/244; 212/189; 280/415.1
[58] Field of Search ............... 224/273; 414/462, 539, 414/540, 541, 590, 718, 542, 543, 546, 550; 212/265, 261, 251, 254, 232, 235, 238, 243, 244, 189; 280/415.1

[56] References Cited

U.S. PATENT DOCUMENTS

| | | | |
|---|---|---|---|
| 3,784,035 | 1/1974 | Dunbar | 414/543 |
| 4,069,922 | 1/1978 | Hawkins | 414/543 X |
| 4,508,233 | 4/1985 | Helms | 414/543 X |
| 4,527,935 | 7/1985 | Fortenberry | 414/24.5 |
| 4,710,090 | 12/1987 | DeLuca et al. | 414/550 |
| 4,881,864 | 11/1989 | Amato | 414/543 |
| 5,029,740 | 7/1991 | Cox | 224/42.01 |

FOREIGN PATENT DOCUMENTS

| | | | |
|---|---|---|---|
| 308381 | 2/1969 | Sweden | 414/543 |
| 657946 | 9/1951 | United Kingdom | 414/543 |
| 2112737 | 7/1983 | United Kingdom | 414/543 |

OTHER PUBLICATIONS

Clip-on Loader-Mechanical Handling-Apr. 1970-p. 197.

Primary Examiner—Frank E. Werner
Attorney, Agent, or Firm—Richard C. Litman

[57] ABSTRACT

A modular, readily assembled crane for mounting on a vehicle trailer hitch drawbar and reconfigurable for stand alone, rollabout operation. A receptacle rotatably supports a vertical column, boom arm, and lifting device, which may be a hydraulic jack or a winch. The receptacle has a lateral projection cooperating with the drawbar and two lateral projections to engage outriggers to steady the device and to support weight. The outriggers may be omitted. The same three projections, when reconfiguring the crane to rollabout operation, cooperate with a readily built up frame riding just above a floor, supported on casters. Rollabout frame length, boom arm angle, boom arm length, and outrigger height are adjustable. A non-lubricated PTFE washer serves as a rotating bearing. Optional parts include a receiving unit mountable to a vehicle in the absence of a trailer hitch, and a similar unit mountable to a wall surface.

6 Claims, 4 Drawing Sheets

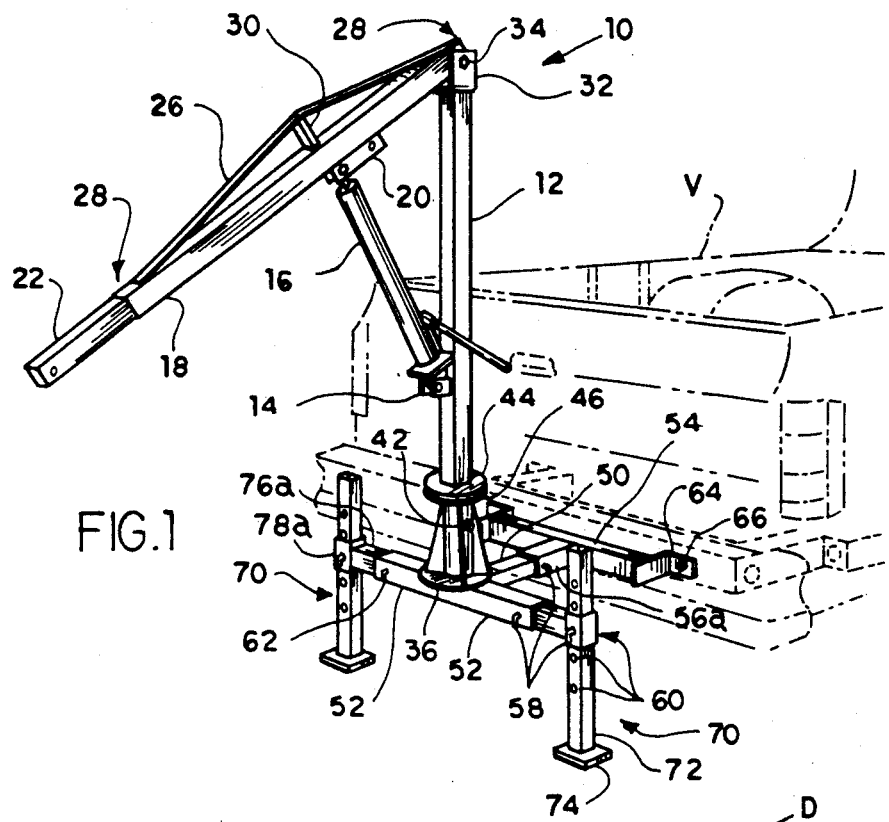
FIG.1
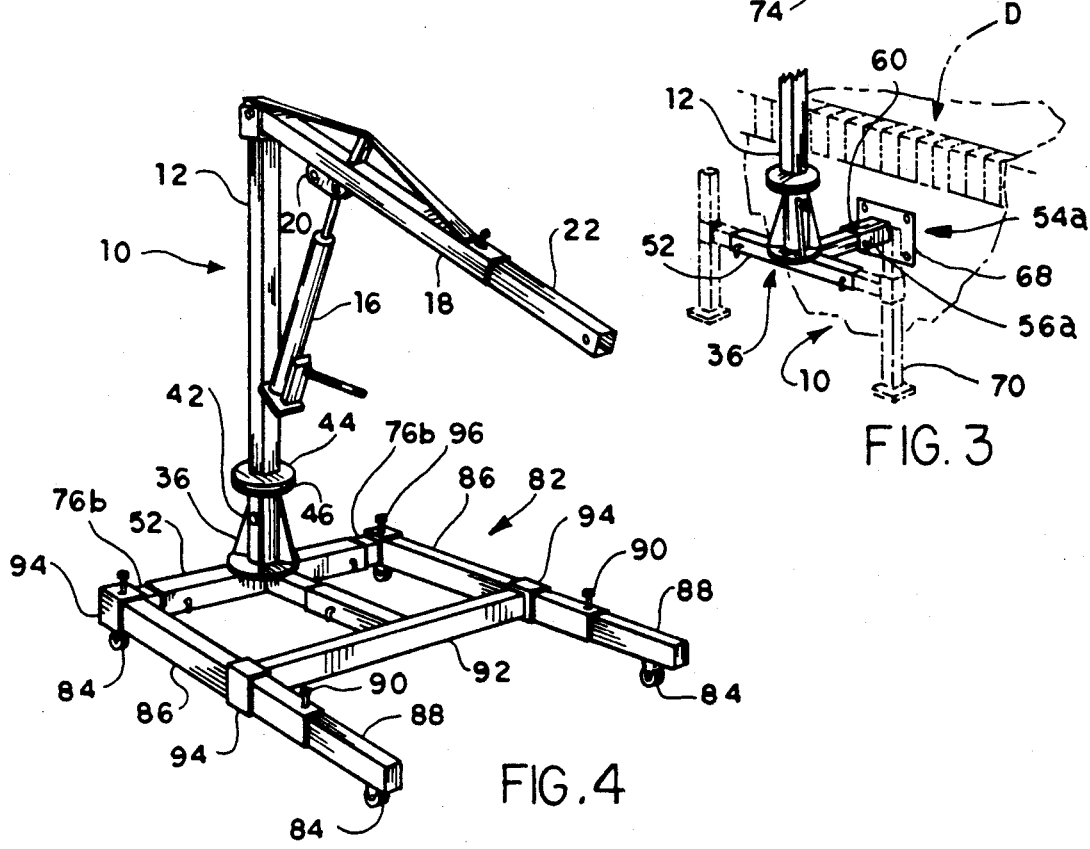
FIG.3
FIG.4

MOBILE CRANE

FIELD OF THE INVENTION

The present invention relates to a readily assembled and disassembled crane which may be selectively attached to a trailer hitch drawbar and may be mobile and stand alone.

DESCRIPTION OF THE PRIOR ART

Many cranes attachable to a vehicle, and especially to a trailer hitch drawbar have been devised over the years. U.S. Pat. No. 4,881,864, issued to Joesph G. Amato on Nov. 21, 1989, exemplifies a crane having a central column, an incrementally adjustable foot extending beneath this column to support weight, and a laterally extending tubular member cooperating concentrically with a trailer hitch drawbar. A boom arm lifted by a winch which is mounted atop the column, and can rotate 360 degrees.

U.S. Pat. No. 5,029,740, issued to Gary L. Cox on Jul. 9, 1991, discloses certain construction features commonly employed by readily assembled cranes. Cox discloses square or rectangular tubular structural members, concentrically cooperating with a trailer hitch drawbar, hand operated connectors, and a wheeled or roller borne frame to permit rollabout operation when not connected to a vehicle.

U.S. Pat. No. 4,527,935, issued to Durrel W. Fortenberry on Jul. 9, 1985, discloses a trailer having an adjustable steadying and load supporting outrigger.

None of the above patents, taken either singly or in combination, is seen to describe the instant invention as claimed.

SUMMARY OF THE INVENTION

The present invention combines the well known rollabout crane, the drawbar attached crane as exemplified above, and the readily assembled, disassembled, and stowed crane using concentric tubing and readily assembled fasteners, and adds to the capabilities of these devices.

An otherwise conventional boom arm and lifting device, such as a hydraulic cylinder, are mounted on a central vertical column. The column is rotatably supported within a receptacle unit having a plurality of lateral projecting members. One projecting member engages the drawbar of a trailer hitch in known fashion. Additional projecting members, preferably two in number, hold outriggers to steady the crane and support weight; the additional projecting members are left idle in the event that outriggers are not required.

The crane is readily reconfigured to assume rollabout form. In this form, the receptacle unit interfits with essentially linear tubular members to form a rectangular floor base, riding close above a floor surface on rollers or wheeled casters.

The crane is constructed from square or rectangular tubing having telescoping, overlapped joints between tubing members. These joints are secured by penetrating hand pins or by threaded members. Some joints are adjustable, and are secured by setscrews.

Conventional lifting devices, such as hydraulic cylinder jacks or winches are attached to the column and boom arm.

A dry, low friction bearing located between the receptacle and the column is provided by a washer faced with low friction material such as PTFE.

An anchoring member attachable to a vehicle and serving in lieu of a trailer hitch drawbar is provided for optional use. In a second embodiment, a similar anchoring member is provided which fastens to a vertical planar surface, such as a wall or loading dock. In a third embodiment, the anchoring member attaches to the crane at a plurality of points.

Accordingly, an object of the present invention is to provide a crane which is readily assembled and disassembled.

A second object is to provide a crane which is mountable to a vehicle.

A third object is to provide a mobile, self-supporting crane.

Another object is to provide a crane capable of rotating about a vertical axis, whereby a load may be raised in one location and lowered in another location.

Still another object is to provide a crane which is readily mounted on a stationary, vertical surface, e.g., a wall.

Yet another object is to provide a crane which is readily attachable to a conventional vehicle trailer hitch drawbar.

A further object is to provide a crane which may be disassembled into components occupying minimal volume.

An additional object is to provide a crane which may be provided with a manual or powered prime mover.

A still further object is to provide a crane capable of steadying itself when in a mobile, self-supporting configuration.

A yet further object is to provide a crane capable of steadying itself when configured to be attached to a vehicle.

Yet another object is to provide a rotating crane having a dry, low friction bearing which needs no maintenance during the service life of the crane.

A still additional object is to provide a crane of rugged yet uncomplicated and inexpensive construction.

With these and other objects in view which will more readily appear as the nature of the invention is better understood, the invention consists in the novel construction, combination and assembly of parts hereinafter more fully described, illustrated and claimed with reference being made to the attached drawings.

BRIEF DESCRIPTION OF THE DRAWINGS

FIG. 1 is an environmental perspective view of the crane configured to be attached to a vehicle, including optional outriggers.

FIG. 3 is an environmental partial perspective, detail view of the crane configured to be attached to a vertical surface or wall, according to a second embodiment.

FIG. 4 is a perspective view of the crane in a stand alone, rollabout configuration.

Similar reference characters denote corresponding features consistently throughout the attached drawings.

DETAILED DESCRIPTION OF THE PREFERRED EMBODIMENTS

Figure 2:
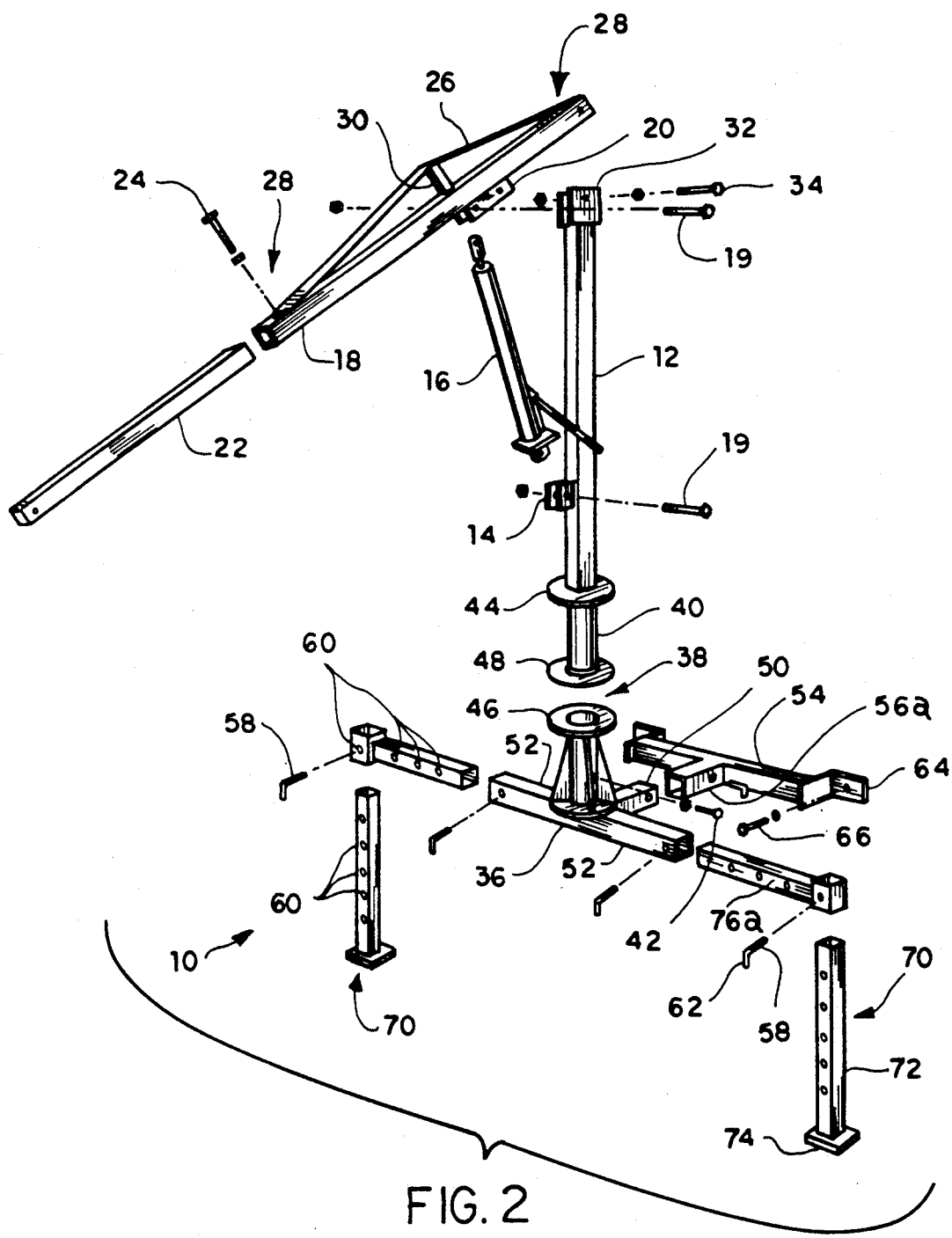
FIG. 2 is an exploded perspective view of the crane of FIG. 1.

The mobile crane 10 of the present invention is seen in FIGS. 1 and 2, attached to a vehicle V and ready to lift a load (not shown). The crane 10 includes a central column 12 having brackets 14 to attach a lifting device 16 and a pivotally mounted boom arm 18, also having brackets 20. An ordinary lifting device 16 may be mounted to the column 12 and boom arm 18 as by bolts 19 (as seen in FIG. 2) using the brackets 14, 20. An hydraulic cylinder 16 is illustrated.

The boom arm 18 has an adjustable length extension 22, secured by a setscrew 24. A strip 26 of metal welded at its ends 28 to the boom arm 18, and supported between the ends 28 on a support member 30, reinforces the boom arm 18. The boom arm 18 is pivotally mounted to plates 32 secured to the column 12 by a bolt 34 penetrating the boom arm 18 and plates 32.

The crane 10 is rotatably supported within a receptacle unit 36 including a receptacle 38, substantially surrounding the annular lower extremity 40 of the column 12. A setscrew 42 is provided to prevent rotation of the column 12, if a particular orientation of the boom arm 18 is desired, or to preclude random swinging thereof. A flange 44 is attached to the column 12 and faces a cooperating flange 46 forming part of the receptacle unit 36. A washer 48, seen in FIG. 2, faced with material of low friction characteristics, such as polytetrafluoroethylene, commonly abbreviated PTFE, separates these two facing flanges 44, 46. The receptacle unit flange 46 bears the weight of the column 12 and its load. The washer 48, which need not be lubricated throughout its service life, serves as a bearing.

The receptacle unit 36 has three projecting members 50, 52, 52. A first, short projecting member 50 mates in telescoping fashion with a trailer hitch drawbar (not shown), if the vehicle V is so equipped. For those vehicles not so equipped, an anchoring unit 54 is optionally provided as part of the invention, the anchoring unit 54 having a projection 56A equivalent to a drawbar and mating with the cooperating first, short projection 50 of the receptacle unit 36.

The telescoping projections 50, 56A lock together by pins 58 inserted in aligned holes 60 in the projections, thus penetrating both projections. These pins are turned out at one end to provide handles 62 for ready manipulation, and will be referred to hereinafter as hand pins.

The anchoring unit 54 has members 64 contacting and solidly fastened, as by bolts 66, to the vehicle V. The anchoring unit 54 is shown in FIGS. 1 and 2.

In a second embodiment, shown in FIG. 3, a similar anchoring unit 54A is provided, but having a planar base 68. This second embodiment anchoring unit 54A can be fastened to a solid vertical surface. In the detail illustrated in FIG. 3, the second embodiment anchoring unit 54A is mounted to the wall at a loading dock D.

To steady the crane 10, and to increase the ability of the anchoring unit projection 56A alone to bear weight, optional outriggers 70 are provided. The outriggers 70, which include elongate shafts 72 and enlarged feet 74, attach to the receptacle unit 36 by intermediate arms 76A. Each intermediate arm 76A, seen better in the exploded view of FIG. 2, interfits in telescoping fashion with one of the two longer, opposing projections 52 of the receptacle unit 36. The intermediate arms 76A are secured to the receptacle unit longer projections 52 by hand pins 58. The intermediate arms 76A terminate in open sockets 78 partially surrounding the outrigger shaft 72 and permitting this shaft 72 to pass therethrough to accommodate height adjustment.

The outrigger shafts 72 have a plurality of holes 60 allowing a hand pin 58 to be inserted therein, thus penetrating the socket 78 to secure the outrigger 70 to the receptacle unit 36 at a selected height above the ground. If the outriggers 70 are not used, the two receptacle unit opposing projections 52 are idle, and the intermediate arms 76A also are not used.

Figure 6:
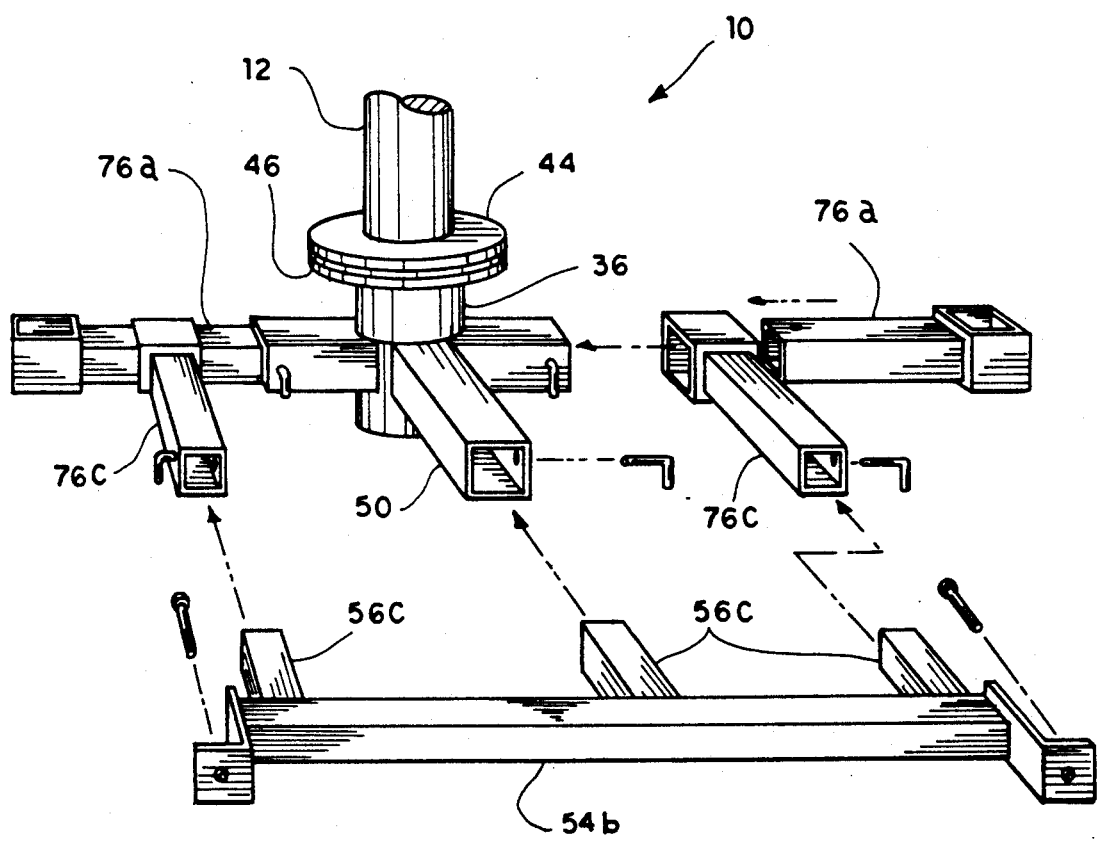
FIG. 6 is a partial, exploded perspective view of a third embodiment of the present invention.

In a third embodiment, the crane 10 is connected at three points to a anchoring unit 54B, seen in FIG. 6. Intermediate arms 76A, used with outriggers 70, are again employed, and connect to intermediate arms 76C. These arms 76C project laterally to engage cooperating anchoring unit projections 56C. This third embodiment, in which only two points of connection may be utilized if desired, provides additional stability and weight bearing capacity. The outriggers 70 may be used with or omitted from the third embodiment.

Figure 5:
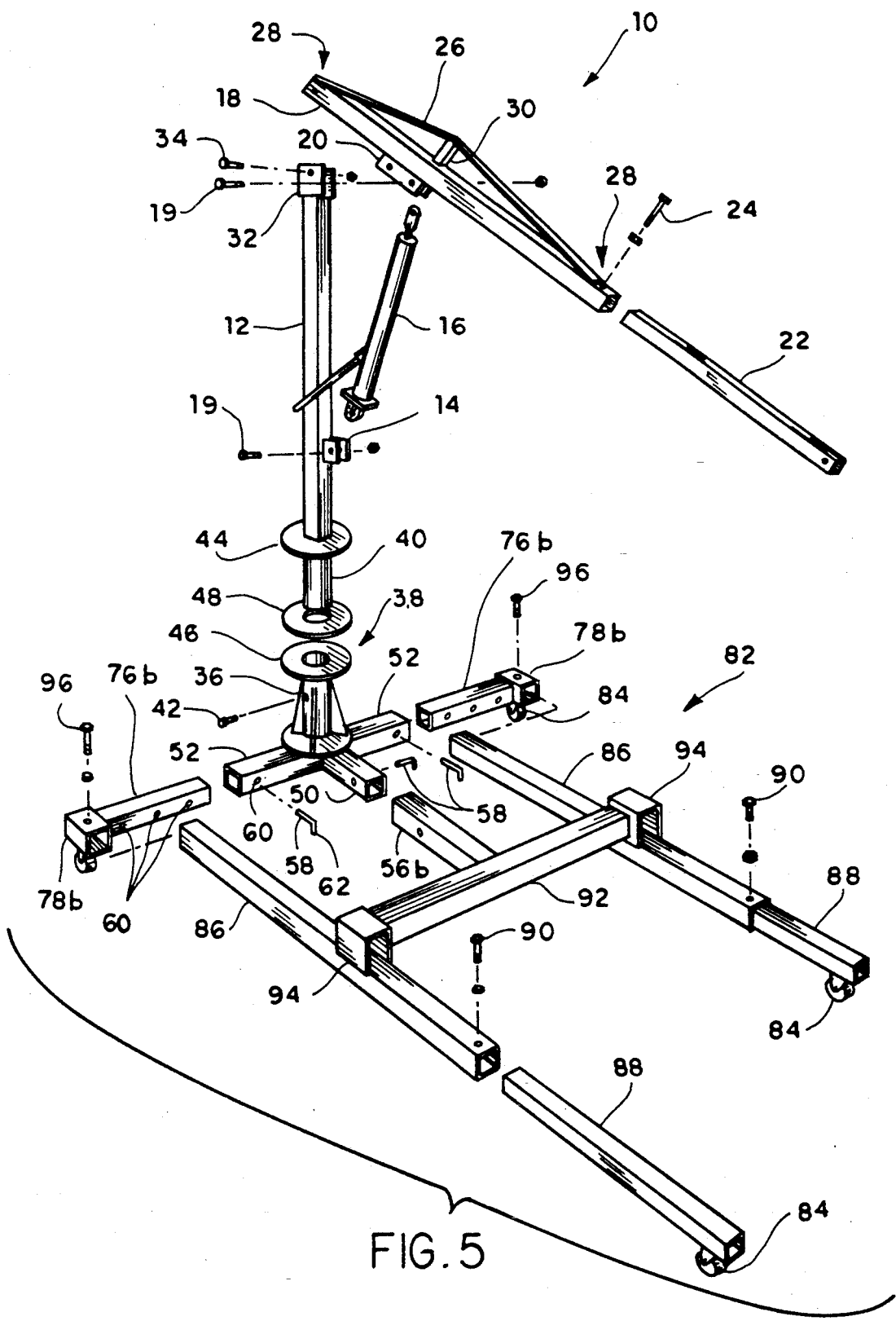
FIG. 5 is an exploded, perspective view of the crane of FIG. 4.

Turning now to FIGS. 4 and 5, the crane 10 is designed to be readily reconfigured to provide a horizontal base 82 supported just above a floor surface on casters or rollers 84. This base 82 will be referred to hereinafter as a floor base. New intermediate arms 76B are inserted into the two opposing projections 52 of the receptacle unit 36, but rotated 90 degrees relative to the intermediate arms 76A formerly used to provide connection to the outriggers 70 so that the new sockets 78B accept cooperating linear floor base members 86, oriented parallel to a floor surface. The two linear floor base members 86 are inserted into the sockets 78B, and two floor base extensions 88 are inserted into the linear floor base members 86. The linear floor base members 86 are pinned within the sockets 78B by setscrews 90. The floor base extensions 88 are similarly secured to the linear floor base members 86.

A projection 56B of a T-shaped brace 92 is installed over the short projection 50 of the receptacle unit 36, in the same manner as the projection 56A of the anchoring unit 54. The brace 92 partially surrounds the linear floor base members 86 by three sided sockets 94, and a setscrew 96 secures this connection. A hand pin 58 fastens the brace 92 to the receptacle unit 36 at the telescoping projections 50,56B.

The floor base extensions 88 and intermediate arms 76B have permanently affixed casters or rollers 84. A total of four casters 84 are provided to support the rectangular, relatively long, wide floor base 82.

The boom arm 18, boom arm extension 22, column 12, receptacle unit projections 50,52, outrigger shafts 72, intermediate arms 76A and 76B, linear floor base members and extensions 86,88, and the T-shaped brace 92 are structural members formed from tubing. This tubing is non-annular in cross section, square tubing being shown throughout the drawing figures, so that relative rotation of telescoping tubular members is prevented. Only the lower extremity of the column 12 and the receptacle 38 holding the column 12 are annular in cross section, this arrangement enabling the desired rotation of the column 12 and boom arm 18.

Structural members and sockets are of course provided with orifices, threaded where necessary to cooperate with threading on bolts or setscrews, wherever penetrating hand pins or bolts are shown or described, regardless of whether such orifices are specifically called out. Furthermore, it will be appreciated that setscrews may bear against depressions formed in a surface of a member being secured thereby, or may penetrate an orifice introduced into the surface to preclude slippage if tightness of the setscrew is not maintained, or to indicate a particular adjustment position wherein a particular position is frequently used. Since these features are well known to those skilled in the art, no illustration thereof is necessary.

It is possible to use a single size of bolt or similar threaded fastener wherever bolts are called for, whereby only one size wrench or other hand tool is required for assembly and disassembly of the crane 10 in its several configurations. Assembly and disassembly of the crane 10 may thus be accomplished by hand, where hand pins are used, and by a single hand operated tool, where threaded fasteners are required. Where a hand operated lifting device 16 is used, such as a common hydraulic jack, the crane 10 may therefore be assembled, operated, disassembled, stowed and carried readily by a single person.

It is to be understood that the present invention is not limited to the embodiments described above, but encompasses any and all embodiments within the scope of the following claims.

I claim:

1. A crane having a rotatable boom arm and selective mounting means, said crane comprising:
    a rotatable boom arm supported atop said crane, said boom arm pivoting selectively about any horizontal axis;
    a vertical central column supporting said boom arm and having a first flange projecting radially therefrom and a lower extension extending below said first flange, said lower extension being round in cross section and having a diameter;
    a receptacle including an upwardly oriented socket being round in cross section and having a bottom wall and a diameter just greater than said lower extension diameter, said socket cooperating with said column lower extension, wherein said column is rotatably retained within said receptacle;
    said receptacle further comprising,
        a second flange projecting radially therefrom and being axially aligned with said socket and said first flange, and washer means conforming to a shape of said first flange and being faced with polytetrafluoroethylene, said washer means also including a central opening therein, thereby enabling penetration of said column lower extension therethrough, said washer means lying between said first and second flanges, wherein said column is constrained against downward motion into said socket upon abutment of said washer means with said first and second flanges,
        at least one shorter horizontal projection and at least two longer horizontal projections secured to said receptacle and projecting radially therefrom, said longer and shorter projections having cross sectional configuration other than round, said shorter and longer horizontal projections including means defining a hole therethrough, wherein a telescoping member cooperating with said horizontal projections in telescoping fashion is constrained against axial relative rotation therewith and further is releasably secured to said projections by projection hand pins;
    said selective mounting means further comprising one member for selectively attaching, steadying, and supporting said crane, telescoping over at least one of said shorter and longer horizontal projections and being secured thereto by additional hand pins, and being attachable, in turn, to anchoring means selectively resting upon an environmental surface and attachable to an environmental surface and to a vehicle chassis;
    said receptacle substantially surrounding said column lower extension, wherein said column is supported and maintained in upright orientation by said receptacle, and
    said column and boom arm being rotatable through 360 degrees of rotation, wherein said crane can lift a load in a first location and lower the load in a second location.

2. A crane as claimed in claim 1, said selective mounting means comprising at least one releasably attached outrigger means contacting a horizontal environmental surface below said crane, said outrigger means comprising:
    an intermediate horizontal arm slidingly engaging one of said receptacle longer horizontal projections in telescoping fashion, said intermediate arm having means defining a plurality of holes therein, said intermediate arm holes being selectively aligned with said horizontal projection hole, wherein said projection hand pin is removably inserted, thereby adjustably and releasably fastening said outrigger means to said receptacle, said intermediate arm further terminating in a socket and further including a vertical arm having a foot, said socket being oriented so that said vertical arm is axially oriented normal to said intermediate arm, said socket and said vertical arm also having means defining holes being selectively aligned, hand pins being removably inserted therein, whereby said vertical arm is adjustably and releasably secured to said outrigger means, and said outrigger means function to steady and support said crane.

3. The crane as claimed in claim 1, said selective mounting means comprising floor base means including;
    a frame having two equally long, parallel, horizontally oriented rails having a length, each of said rails having a first end and a second end, said first end having means defining a hole extending therethrough, said second end slidingly engaging said first end in telescoping fashion, said first and second rail ends having means defining aligned holes therethrough, hand pins being removably inserted therein, whereby said rail length is adjustable;
    said at least two crane receptacle longer horizontal projections having second intermediate arms including second sockets oriented to open horizontally, each one of said second sockets also having means defining a hole therein extending therethrough, said floor base rails engaging said second sockets;
    said second sockets and said floor base rail first ends being attached by hand pins releasably inserted in said rail first end and second socket holes; and
    T-shaped brace means including a first member having three sided sockets to grasp said floor base rails, said first member spanning said floor base rails, and a stem member normal to said T-shaped brace first member projecting toward one of said receptacle horizontal projections, and telescoping therewith, said stem member having means defining a hole, whereby said stem member is secured to said one of said receptacle horizontal projections, whereby said crane stably holds a load and also may be moved by rolling across a generally horizontal environmental surface.

4. The crane as claimed in claim 1, said selective mounting means comprising anchoring means readily attachable to and detachable from said crane, said anchoring unit also being attachable to a vertical surface, said anchoring unit having forward and rearward ends;

said anchoring unit comprising, at said anchoring unit forward end, an anchoring unit horizontal arm slidably engaging at least one of said receptacle horizontal projections in telescoping fashion, said anchoring unit horizontal arm having means defining a hole extending therethrough and being aligned with said receptacle horizontal projection hole, a hand pin being removably inserted therein; and at said anchoring unit rearward end, a member having a vertical rearward surface and fastener means projecting rearwardly of said anchoring unit rearward end vertical surface, whereby said anchoring unit is attachable to a vertical surface at said rearward end and attachable to said crane receptacle at said forward end.

5. The crane as claimed in claim 1, said selective mounting means comprising an anchoring unit readily attachable to and detachable from said crane, said anchoring unit also being attachable to a vertical surface, said anchoring unit having forward and rearward ends;

said anchoring unit comprising, at said anchoring unit forward end, an anchoring unit horizontal arm slidably engaging one of said receptacle horizontal projections in telescoping fashion, said anchoring unit horizontal arm having means defining a hole extending therethrough and being aligned with said receptacle horizontal projection hole, a hand pin being removably inserted therein; and at said anchoring unit rearward end, a member having a vertical rearward surface and fastener means projecting rearwardly of said anchoring unit rearward end vertical surface, whereby said anchoring unit is attachable to a vertical surface at said rearward end and attachable to said crane receptacle at said forward end.

6. A crane as claimed in claim 1, further having means to connect a detachable means for lifting to said column and to said boom arm, whereby readily available means for lifting, a hydraulic jack for example, operates said crane.

* * * * *